(12) United States Patent
Weiss

(10) Patent No.: US 7,301,133 B2
(45) Date of Patent: Nov. 27, 2007

(54) TRACKING AUTO FOCUS SYSTEM

(75) Inventor: Adam Weiss, Pickering (CA)

(73) Assignee: Photon Dynamics, Inc., San Jose, CA (US)

( * ) Notice: Subject to any disclaimer, the term of this patent is extended or adjusted under 35 U.S.C. 154(b) by 0 days.

(21) Appl. No.: 11/314,960

(22) Filed: Dec. 20, 2005

(65) Prior Publication Data

US 2006/0202103 A1 Sep. 14, 2006

Related U.S. Application Data

(60) Provisional application No. 60/646,119, filed on Jan. 21, 2005.

(51) Int. Cl.
*G01N 21/00* (2006.01)
*H01J 3/14* (2006.01)

(52) U.S. Cl. .............................. 250/201.3; 250/559.45

(58) Field of Classification Search ............ 250/201.1, 250/201.3, 201.4, 559.45
See application file for complete search history.

(56) References Cited

U.S. PATENT DOCUMENTS

| | | | |
|---|---|---|---|
| 5,760,893 A * | 6/1998 | Raymond | 356/237.1 |
| 5,780,866 A * | 7/1998 | Yamamura et al. | 250/559.22 |
| 6,282,309 B1 * | 8/2001 | Emery | 382/145 |
| 6,736,588 B1 * | 5/2004 | Baldwin et al. | 414/676 |
| 7,084,970 B2 * | 8/2006 | Weiss et al. | 356/237.5 |
| 2006/0226865 A1 * | 10/2006 | Gallarda et al. | 324/770 |

* cited by examiner

*Primary Examiner*—John R. Lee
(74) *Attorney, Agent, or Firm*—Townsend and Townsend and Crew LLP

(57) ABSTRACT

A tracking auto-focus system maintains a microscope pointed at a TFT array continuously in focus so as to eliminate the auto-focusing time that would otherwise be required. The tracking auto-focus system includes, in part, a microscope Z actuator, an auto-focus sensor, an analog-to-digital converter (ADC), a signal conditioner, a digital proportional integrating and differentiating (PID) controller, and a digital-to-analog converter. The actuator adjusts the distance between the microscope's objective lens and the target and includes, in part, an amplifier, a linear motor, and a linear encoder which provides positional feedback. The auto-focus sensor together with the ADC and signal conditioner continuously monitor and detect the distance between the microscope's objective lens and the target and supply the measured distance to the amplifier. The PID controller together with the DAC stabilizes the distance separating the microscope's objective lens and the target to maintain the best focus.

27 Claims, 5 Drawing Sheets

TRACKING AUTO FOCUS SYSTEM

CROSS-REFERENCES TO RELATED APPLICATIONS

The present application claims priority under 35 U.S.C. 119(e) from application Ser. No. 60/646,119, filed Jan. 21, 2005 entitled "Tracking Auto Focus System", the content of which is incorporated herein by reference in its entirety.

BACKGROUND OF THE INVENTION

The present invention relates to the flat panel displays based on liquid crystal (LC) technology, and more particularly to the inspection of components formed on such displays.

During the manufacturing of LC displays, large clear plates of thin glass are used as a substrate for the deposition of thin film transistor (TFT) arrays. Usually, several independent TFT arrays are contained within one glass substrate plate and are often referred to as TFT panels.

TFT pattern deposition is performed in a multitude of stages where in each stage, a particular material (such as a metal, indium tin oxide (ITO), crystalline silicon, amorphous silicon, etc.) is deposited on top of a previous layer (or glass) in conformity with a predetermined pattern. Each stage typically includes a number of steps such as deposition, masking, etching, stripping, etc.

During each of these stages and at various steps within each stage, many production defects may occur that may affect the electrical and/or optical performance of the final LCD product. Such defects include but are not limited to metal protrusion 110 into ITO 112, ITO protrusion 114 into metal 116, a so-called mouse bite 118, an open circuit 120, a short 122 in a transistor 124, and a foreign particle 126, as shown in FIG. 1. Other defects include mask problems, and over or under etching.

Even though the TFT deposition processes are tightly controlled, defect occurrence is unavoidable. This limits the product yield and adversely effects production costs. Typically, the TFT arrays are inspected using one or multiple Automated Optical Inspection (AOI) system(s) following critical deposition stages and by an opto-electrical inspection machine, also referred to as array checker (AC), to test the finished TFT arrays. Commonly AOI and AC systems provide defect coordinates; they do not provide high resolution images required to classify defects as killer, repairable or just imperfections not affecting the TFT array performance (so called process defects). The defect coordinate information is passed to a TFT array repair tool, also referred to as array saver (AS), and such classification is conventionally done manually by the TFT array repair machine operator.

The average number of defects per plate may vary from one TFT array manufacturer to another and from one manufacturing plant to another. Typically, the defect review and repair capacity within the TFT array fabrication line is sized to process 300-400 defects per $7^{th}$ generation plates. Typically 5 to 10% of defects per plate are assumed to require repair.

Since the TFT array features are typically very small (typical sub-pixel size is 80×240 µm), the defect review—to decide whether the defect is repairable—is performed using a microscope. The microscope field of view is small (ranging from 100×100 µm to 2×2 mm) relative to the plate size (typically 2.1×2.4 m). As shown in FIG. 2, the microscope is installed on a precision XY stage so that it could be dispatched from one defect to another. The defect coordinates are known from inspections carried out earlier by AOI and AC inspection systems. The glass plate remains immobilized under the XY stage by means of a vacuum chuck during the defect review and repair. Following the review, the repairable defects are typically treated by means of laser trimming, laser welding or by bridging open line defects typically using a chemical vapor deposition (CVD) technique.

Depth of focus range of the microscope can be as small as, for example, +/−0.6 microns when a high magnification is used. Maintaining such Z position of the plate relative to the inspection or repair optics is difficult because of, for example, (a) the relatively large plate size, (b) the variations in plate thickness, (c) non-zero Z variations in the inspection/repair stage as it moves in X and Y, and (d) non-zero Z variations in plate holder (chuck) over the expanse of the plate. As a result, after dispatch to a new defect location, the microscope needs to be refocused to provide a sharp image for defect review and to enable acquisition of the required laser spot size to facilitate proper laser trimming. Consequently, focusing of the microscope is always performed at the new defect location and is done automatically. Typically the auto-focusing action lasts approximately on the order of seconds. During this period, the instrument is neither used for defect review nor for laser trimming and thus the instrument remains idle. With typically 400 defects per plate, the auto-focusing consumes approximately 400 seconds of instrument idle time. The idle time undermines the efficiency of instrument utilization. Reducing or eliminating the auto-focusing periods becomes particularly important when the array saver instrument is equipped with an automatic defect repair capability, i.e., repair without operator assistance.

FIG. 2 shows an exemplary TFT array repair machine. In FIG. 2, reference numerals 202, 204, 206, 208, and 210 respectively identify a granite base, a gantry providing Y motion, an X motion carriage, a microscope and laser tool capable of moving in Z direction for focusing, and a chuck adapted to support and immobilize glass plates.

In some known TFT array repair, or array saver instruments, the microscope is equipped with an area scan charge coupled device (CCD) camera for recording the review images and displaying them to the operator on a monitor. Digital image processing (DIP) of the recorded images is subsequently used to extract information about the degree to which auto-correction of the focus may be required. Several DIP algorithms are in wide use for deriving the focus quality criterion (FQC). Most of these algorithms are based on the observation that a sharp, in-focus image exhibits the highest content of high spatial frequency components. Typically DIP algorithms include the following steps: i) normalization of the image intensity; ii) application of high pass digital filter to the image (e.g., the Laplacian operator); iii) application of an absolute value operator to the filtered image; iv) integration (summing) of all the pixel intensity values to obtain the FQC value for the processed image.

FIG. 3 illustrates the FQC as a function of the vertical (Z) position of a microscope objective lens and derived from an array image over the range of ±20 µm around the best focus point. A ×20 objective lens magnification and an aperture of 0.42 were used to generate FIG. 3. Each dot on the curve corresponds to a separate image. In the example of FIG. 3, the best focus, judged visually, coincides with the maximum value of FQC at −2.5 µm.

The DIP based auto-focusing method is relatively simple and inexpensive and requires no additional hardware; however, it suffers from a number of number of deficiencies, a few of which are described below. First, high contrast features are needed in the imaged scene for computing the FQC. Therefore, the DIP method fails on blank or almost blank images. Second, a single sample of the FQC does not indicate whether the microscope is above or below the best focus point. Also, a single sample of FQC is insufficient to determine the distance that will achieve the best focus position. Therefore, the DIP method requires more than one image to deduce best focus. Third, outside of a relatively narrow range (e.g., ±20 µm for ×20 objective) the FQC becomes non-monotonic. Thus, even multiple samples of FQC often do not indicate the direction towards the best focus position.

To overcome some of the above described deficiencies, a microscope is moved far enough from the best focus position, to ensure that it resides on the known side of the best focus position. The FQC curve is captured concurrently as the microscope is moved towards the best focus position. During this process, the microscope passes beyond the best focus point to enable locating the maximum point of the related FQC curve. The FQC maximum point is typically computed using interpolation between the captured FQC sample points to improve focusing precision. Subsequently, the microscope is reversed to the position corresponding to the computed FQC maximum point, thereby to provide the near best focus position.

As is well known, the DIP method, notwithstanding the above developments, is slow, and depending on the required auto-focus range and the CCD camera frame rate, may take 1 to 5 seconds to complete the auto-focusing task. For instance if the required auto-focus range is ±150 µm, the FQC is sampled every 5 µm and the camera frame rate is 30 frames per second, capturing FQC over this range can not be done faster then 2 seconds.

One method to optimizing the search for the FQC is to reduce the number of the FQC samples required to find the FQC maximum so as to reduce the auto-focus time. Such a search may be carried out by performing a relatively coarse and fast search over the entire auto-focus range and subsequently performing a finer search in the vicinity of the best focus point. However, even with the optimized search, an auto-focus time below one second may not be achieved.

In accordance with another well known technique, instead of digitally processing the images, the analog composite video signal is processed by an analog high-pass filter and then digitized for computing the FQC. This technique reduces the amount of computation required to obtain the FQC curve, but because the FQC curve needs to be sampled image by image, it suffers from the same drawbacks as the DIP technique. The auto-focusing time achievable using these techniques is approximately 1 second.

FIG. 4 is a schematic representation of another DIP based auto-focus sensor, referred to as a Line Scan DIP sensor (LS-DIP). In FIG. 4, reference numeral 402 represents a defect review camera (area scan CCD), reference numeral 404 represents an image of the structured light illuminated object plane, reference numeral 406 represents a tube lens, reference numeral 408 represents a line scan CCD sensor beam splitter, reference numeral 410 represents a structured light illuminator beam splitter, reference numeral 412 represents a microscope objective lens, reference numeral 414 represents a structured light illuminated object plane, reference numeral 416 represents an object plane, reference numeral 418 represents a line scan camera tube lens, reference numeral 420 represents an image of the structured light illuminated object plane on the line scan image sensor, reference numeral 422 represents a line scan image sensor, reference numeral 424 represents a structured light projection tube lens, reference numeral 426 represents a slit array, reference numeral 428 represents a high intensity light source (for instance super luminescent light emitting diode), reference numeral 430 represents a magnified view of structured light projected onto the object plane, and reference numeral 432 represents a section of the object plane imaged onto the line scan image sensor.

The LS-DIP technique is based on a principle similar to the previously described DIP methods. The technique requires a FQC curve be captured by shifting the microscope along the Z axis and then computing the in-focus Z coordinate corresponding to the FQC curve maximum. Auto-focusing time is somewhat reduced by using the line scan sensor instead of the area scan array for capturing the FQC. For instance, a 512 pixels line scan sensor with 40 MHz pixel clock, can be read every 15 micro-seconds; this corresponds to 66,666 frames per second. Using this frame rate, the time required for capturing the FQC curve is made dependent on the speed of the Z (focusing) motion actuator rather than on the camera frame rate. Since there is no guarantee that the section of the object plane imaged onto the line scan image sensor includes a sufficient number of high contrast features for computing a meaningful FQC, a structure light pattern is projected onto the object plane. Projecting structured light onto the object plane also makes the LS-DIP method usable on plane, featureless objects. Typically with the LS-DIP method, the auto-focus requires approximately 0.5 seconds.

Conventional DIP based auto-focus methods share the common disadvantage of requiring scan along the Z axis to capture the FQC curve. During the scan period, the microscope focus state is undetermined and the auto-focus sequence is launched only upon the arrival at the new defect review location. Thus, the auto-focus time always delays the review process. Moreover because the DIP methods are not capable of maintaining focus during the microscope motion within the XY plane, they are not suitable for on-the-fly rapid defect image capture with a strobe light illumination that freezes the microscope motion to prevent image smearing.

BRIEF SUMMARY OF THE INVENTION

In accordance with the present invention, a microscope is continuously maintained in focus to eliminate the auto-focusing time that would otherwise be required. The in-focus position is maintained so long as the microscope is pointed at a target plate, such as a TFT array undergoing inspection, and regardless of whether the microscope is stationary or in motion.

The tracking auto-focus system that maintains the microscope in continuous focused mode, in accordance with the present invention, includes, in part, a microscope Z actuator, an auto-focus sensor, an analog-to-digital converter (ADC), a signal conditioner, a digital proportional integrating and differentiating (PID) controller, and a digital-to-analog converter.

The actuator is adapted to adjust the distance between the microscope's objective lens and the target and includes, in part, an amplifier, a linear motor, and a linear encoder which provides positional feedback. The auto-focus sensor together with the ADC and signal conditioner are adapted to continuously monitor and detect the distance between the microscope's objective lens and the target and to supply the measured distance to the amplifier. The PID controller together with the DAC stabilizes the distance separating the microscope's objective lens and the target so as to maintain the best focus.

The control loop formed by the amplifiers, PID, DAC and actuator is adapted to minimize the error $\epsilon$ between a predefined value and the detected Z position. For a given glass thickness, the predefined value is maintained constant and corresponds to an approximate in-focus position. To correct for variations in, e.g., glass thickness, the predefined value is dynamically updated to account for such variations as e.g., the glass thickness.

DETAILED DESCRIPTION OF THE INVENTION

In accordance with one embodiment of the present invention, a substantially fixed distance is maintained between a control head and a target surface undergoing inspection and/or repair. To achieve this, a non-contacting sensor (alternatively referred to herein as gap sensor) continuously measures the distance between the control had and the target surface. A servo control system receives the measured distance, and in response, varies the position of the control head relative to the target surface so as to maintain the substantially fixed distance therebetween.

In one embodiment, the control head includes a microscope and/or a repair unit, and the target surface is a TFT array formed on a plate. In such embodiments, the microscope is continuously maintained in focus while being pointed at a TFT array, thereby eliminating the need to take time to re-focus at each site of interest across the TFT array plate. For such exemplary embodiments, it is desirable to maintain a substantially fixed distance between the microscope and the plate, allowing a tolerance range within the depth of field of the microscope. The following description is provided with reference to an embodiment in which the control head is a microscope; however, it is understood that the control head may include other inspection or repair devices, such as a laser trimming device.

Figure 1:
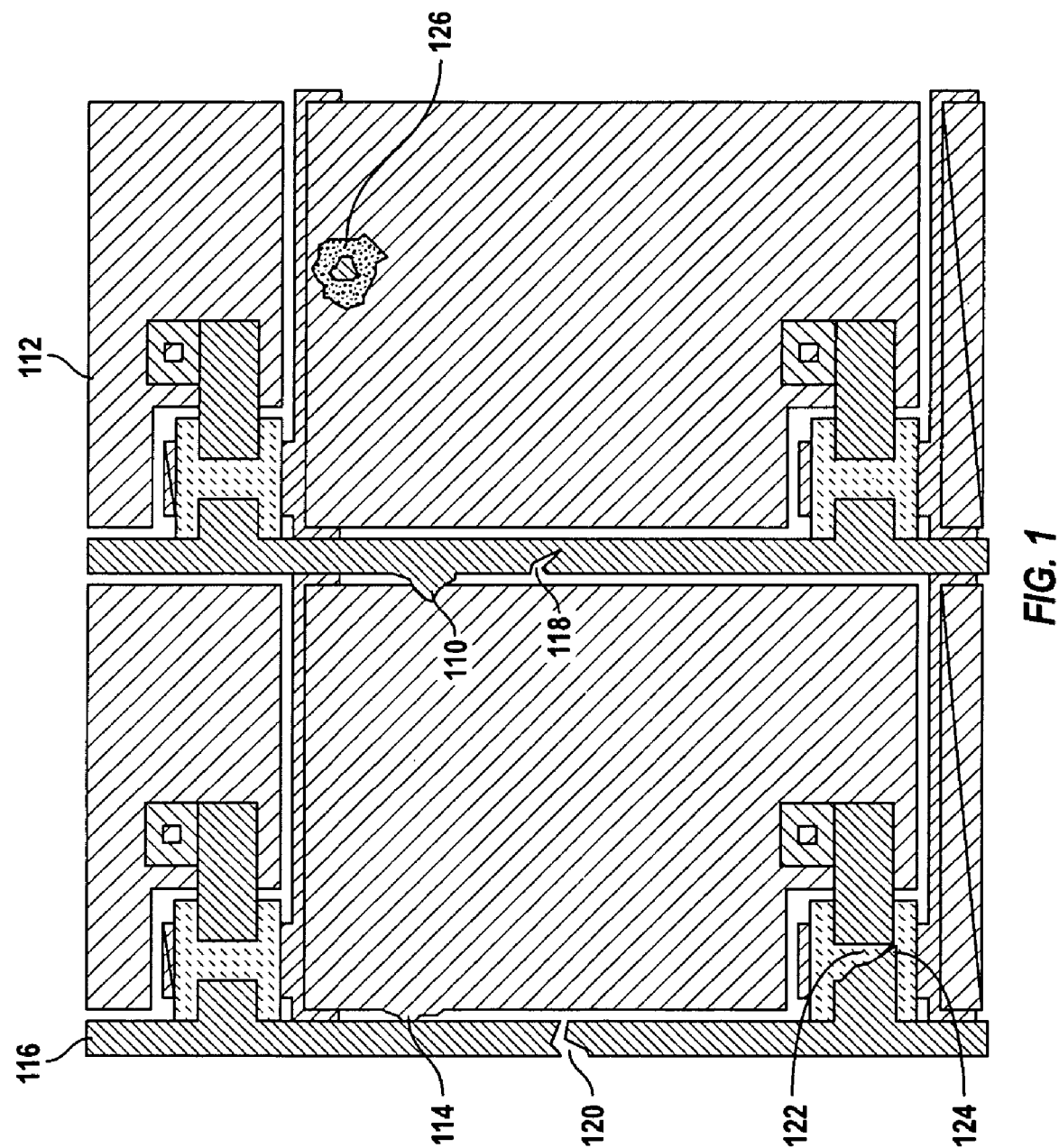
FIG. 1 shows a number of non-periodic defects in a top view of a portion of a large flat patterned medium with periodic transistor arrays.
Figure 2:
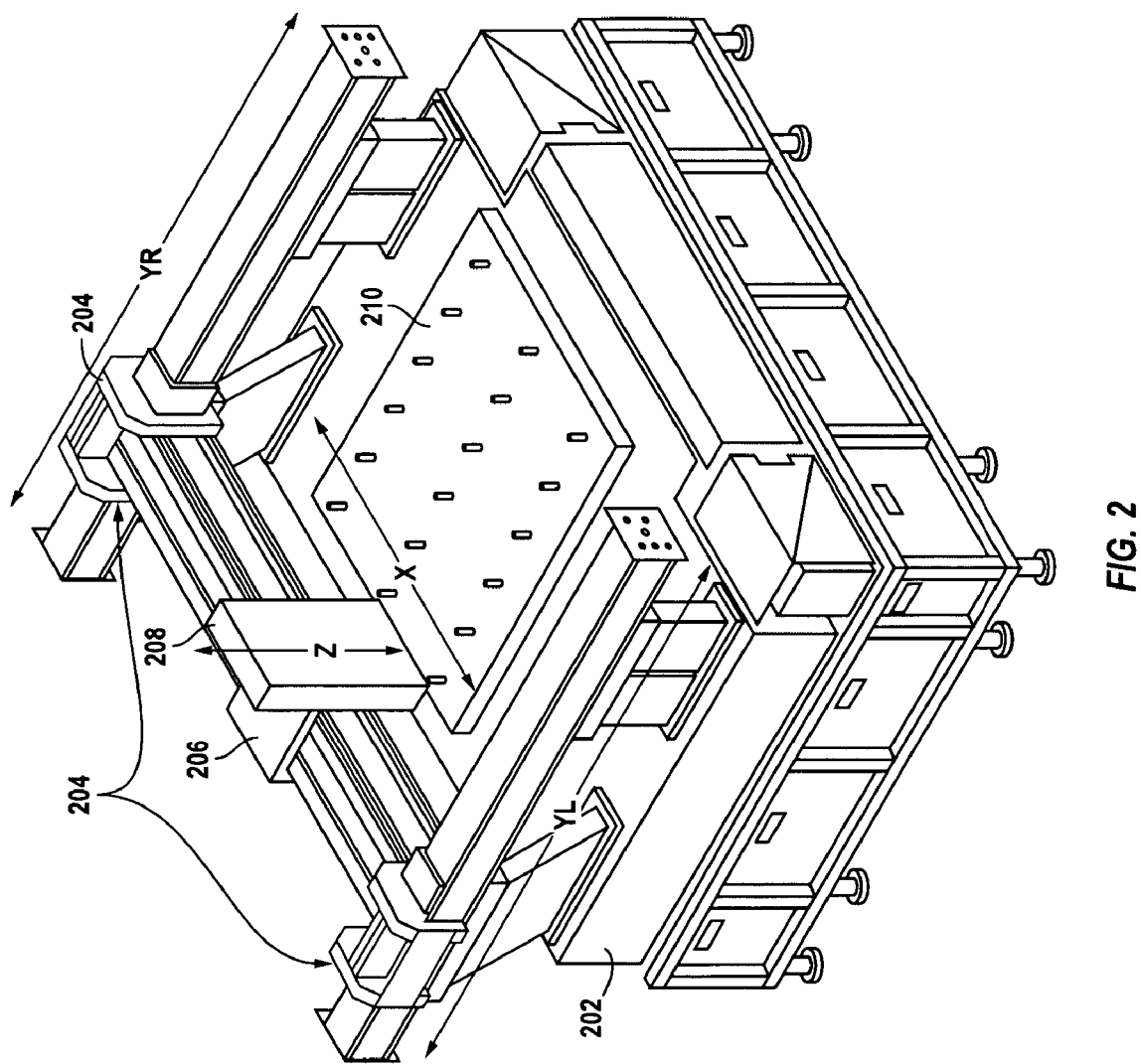
FIG. 2 shows a perspective view of a system adapted to inspect a flat panel display.
Figure 3:
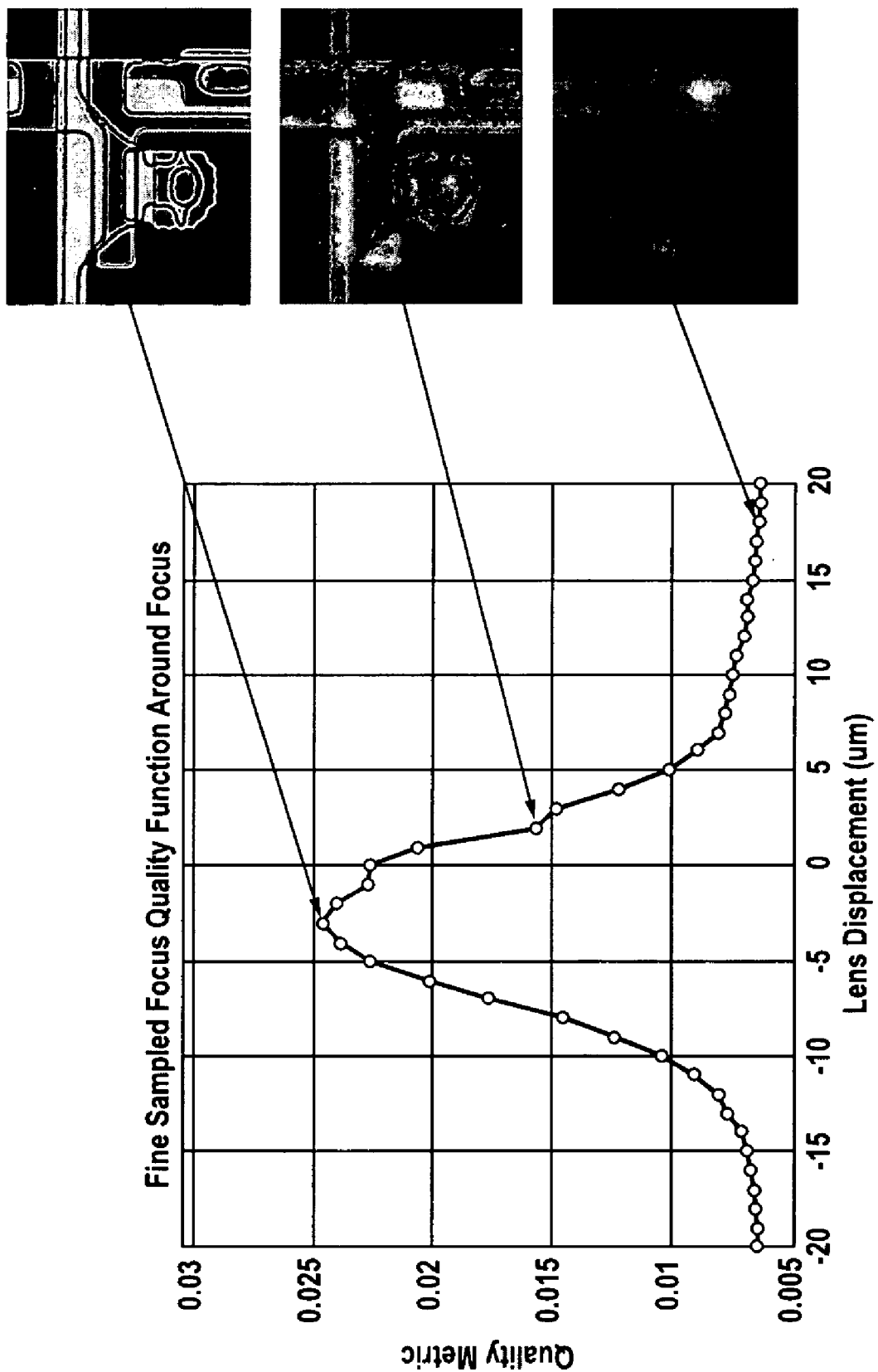
FIG. 3 shows an FQC as a function of the vertical (Z) position of a microscope objective lens.
Figure 4:
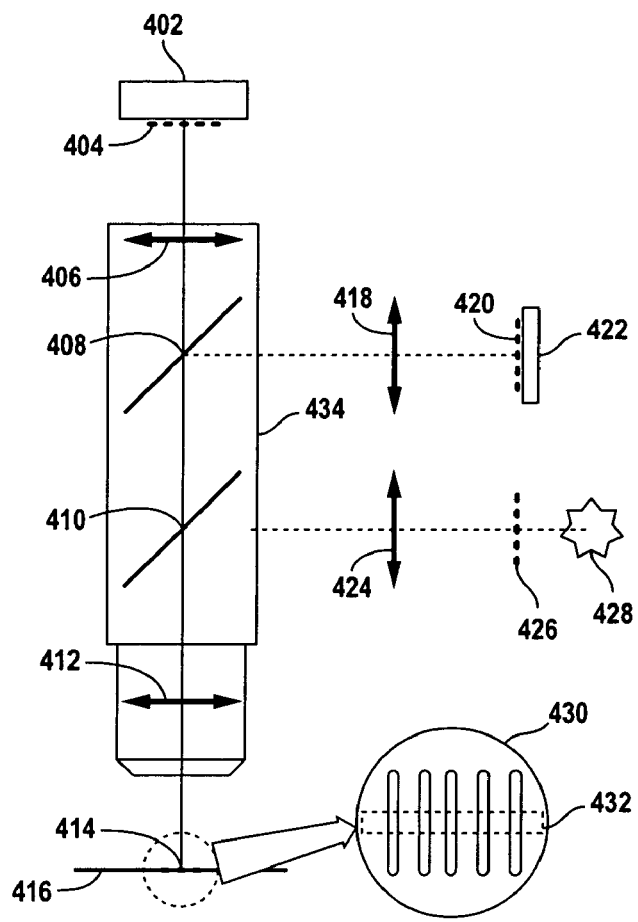
FIG. 4 is a schematic representation of a DIP-based auto-focus sensor.
Figure 5:
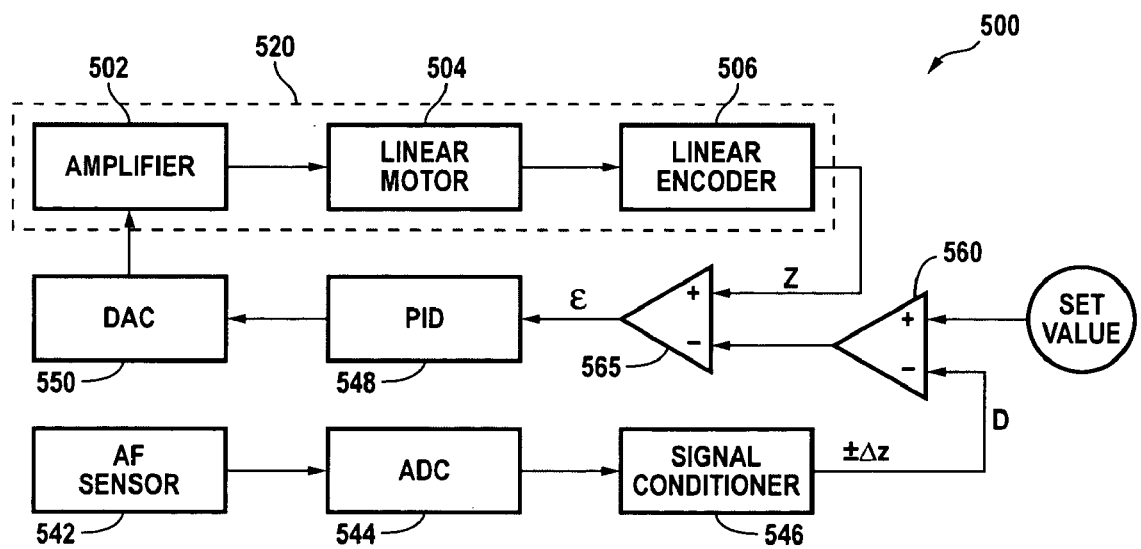
FIG. 5 shows various blocks of a tracking auto-focus sensor array, in accordance with one embodiment of the present invention.

Referring to FIG. 5, the microscope is maintained in the auto-focus mode by a tracking servo control system which includes, in part, a microscope Z actuator 520, a non-contacting gap or height (also referred to herein as autofocus AF) sensor 542, an analog-to-digital converter (ADC) 544, a signal conditioner 546, a digital proportional integrating and differentiating (PID) controller 548, and a digital-to-analog converter 550, as shown in FIG. 5.

Microscope Z actuator 520 is adapted to adjust the distance between the microscope's objective lens and the target and is shown as including, in part, an amplifier 502, a linear motor 504, and a linear encoder 506 which provides positional feedback. The non-contacting gap sensor 542, together with ADC 544 and signal conditioner 546 are adapted to continuously monitor and measure the distance between the microscope's objective lens and the target and to supply the measured distance to controller 560. PID controller 548 together with DAC 550 is adapted to stabilize the distance separating the microscope's objective lens and the target so as to maintain the best focus.

The control loop formed by controller 560, comparator 565, PID 548, DAC 550 and Z actuator 520 is adapted to minimize the error $\epsilon$ between a predefined (also referred to hereinbelow as set) value also supplied to controller 560, and the measured Z position as supplied by gap sensor 542, ADC 544 and signal conditioner 546. Signal conditioner 546 is adapted to linearize the signal it receives from ADC 544 to provide the required accuracy, resolution and repeatability. For a given glass thickness, the set value is maintained constant and corresponds to an approximate in focus position. As is known, limited vacuum chuck flatness and small glass thickness variations prevent the microscope from maintaining focus throughout the entire glass plate. To correct for such variations, the set value is dynamically updated to reflect distance D as measured by gap sensor 542, ADC 544 and signal conditioning block 546.

In one embodiment, controller 560 is an adder/subtractor. The digitized and linearized measured distance between the objective lens and the target surface is added to or subtracted from the set value by controller 560 to compute an updated distance change from the substantially best focus (or set value) value ($\pm \Delta Z$). Comparator 565 compares the updated distance value ($\pm \Delta Z$) received from controller 560 to the distance value received from encoder 506. The result of the comparison is supplied to PID 548 to be used for adjusting the distance between the objective lens and the target surface.

Gap sensor 542 is adapted to have a number of characteristics. In particular, the in-focus indication accuracy of gap sensor 542 is greater than the depth of field of the microscope's objective lens. As is known, the depth of field represents the allowable Z position ambiguity, which does not cause appreciable loss of focus. For example, in one embodiment, assuming the objective lens has a magnification of ×20, and an aperture of 0.42, the gap sensor's accuracy is better then ±1.6 micrometers. The gap sensor 542's accuracy must not be compromised by the TFT pattern and reflections from the bottom surface of the glass plate. Further, the gap sensor 542's operating range must exceed the combined values of the chuck's out-of-flatness and glass thickness tolerances. In one embodiment, the sensor operating range is at least ±150 micrometers. In addition, the gap sensor 542's dynamic response must match or be faster than the microscope travel speed and the rate of change of chuck and glass flatness. In one embodiment, gap sensor 542 generates an output at the rate of at least 2 kilohertz. The gap sensor's output characteristic (output voltage versus "Z" position) does not need to be linear as long as the gap sensor's output distinguishes whether the objective lens is above or below the best focus position.

Figure 6:
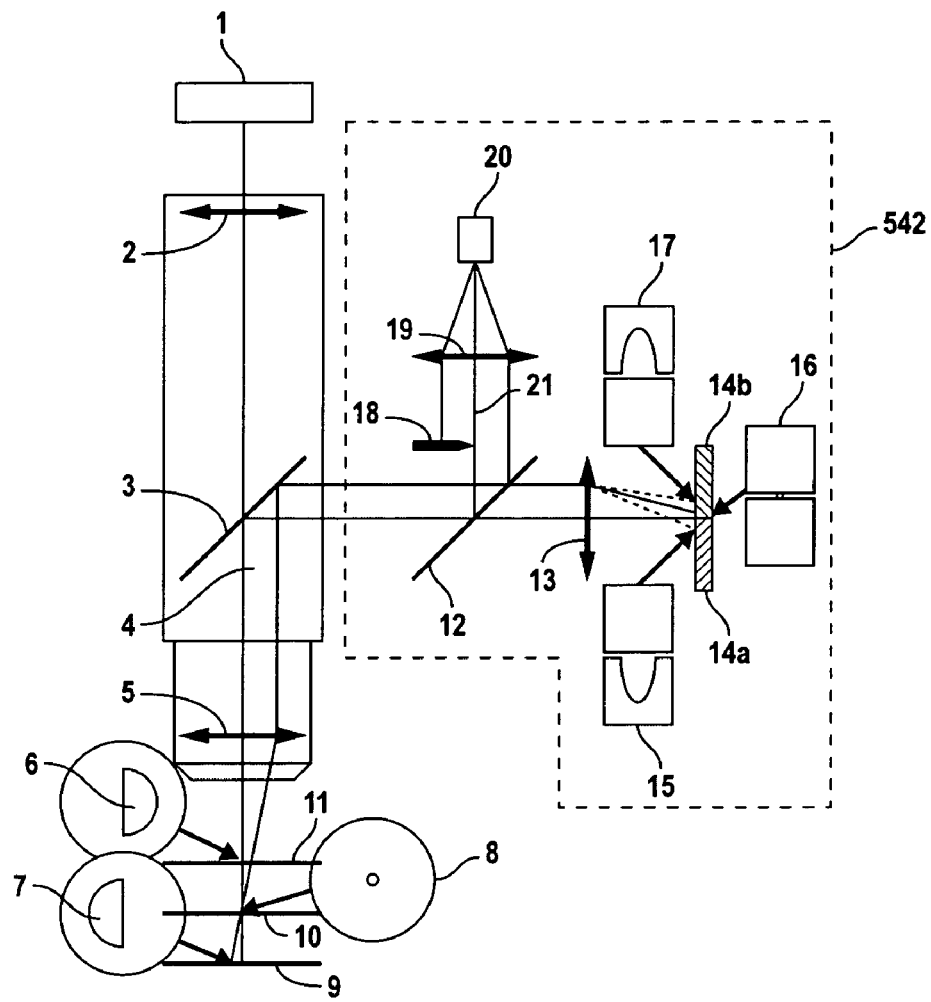
FIG. 6 shows a functional block diagram of a tracking auto-focus that uses an optical AF sensor, in accordance with one embodiment of the present invention.

FIG. 6 shows various components of an auto-focus tracking system using an optical AF sensor, in accordance with one embodiment of the present invention. In FIG. 6, reference numeral 1 represents a defect review camera (area scan CCD); reference numeral 2 represents a tube lens; reference numeral 3 represents a sensor beam splitter; reference numeral 4 represents a collimated laser beam extending over half of the objective lens' entry aperture, reference numeral 5 represents the microscope's objective lens, reference numeral 6 represents a laser beam projected on the plane above the best focus plane, reference numeral 7 represents a laser beam projected on the plane below the best focus plane, reference numeral 8 represents a laser beam projected on a best focus plane, reference numeral 9 represents an out-of-focus plane below the best focus plane, reference numeral 10 represents a best focused plan, reference numeral 11 represents an out of focus plane above the best focus plane, reference numeral 12 represents a laser illuminator beam splitter, reference numeral 13 represents the sensor's tube lens, reference numerals 14a and 14b represent split photo-detectors, reference numeral 15 represents an image of the object plane above the best focus plane, reference numeral 16 represents image of the best focus object plane, reference numeral 17 represents image of the object plane below the best focus plane, reference numeral 18 represents the aperture stop, reference numeral 19 represents a beam expanding and collimating lens system, reference numeral 20 represents a semiconductor laser, and reference numeral 21 represents a collimated laser beam. The components identified with reference numerals 11, 12, 13, 14a, 14b, 15, 16, 17, 18, 19, 20, and 21 collectively represent gap sensor 542 of FIG. 5, which in one embodiment is a Wegu Automated Tracking Focus (ATFocus-4 sensor) available from Wegu Canada Inc, located at 1707 Harbour Street, Whitby, Ontario, Canada, L1N9G6.

Laser diode 20 in conjunction with the beam expander and collimator 19 produces a circular, collimated laser beam 21. Half of the beam 21 is blocked by aperture stop 18 to form a semicircular beam 4. Beam 4, after passing through beam-splitters 12 and 3 as well as objective lens 5 is focused down to a diffraction limited spot on object plane 10, when the microscope is in the best focus position.

Detector 14's position is adjusted such that when the microscope is in the best focus, the image of the laser dot 8 is formed nearly exactly between two sensors 14a and 14b; image 16 corresponds to the best focus position.

Assume that the signal received from detector 14a is denoted as $S_a$, and the signal received from detector 14b is denoted as $S_b$. Combined signal $Y_{ab}$ as derived by electronic circuitry disposed in gap sensor 542 and connected with detectors 14 may be defined as below:

$$Y_{ab} = \frac{S_a - S_b}{S_a + S_b} \quad (1)$$

In the best focus position, the signals from detectors 14a and 14b are balanced, thus the combined signal $Y_{ab}$ is approximately 0 Volts. If object plane 10 is out of focus and is positioned close to the microscope objective lens 5, image 15 is formed on the photo detector 14a thus resulting in the following relation between signals $S_a$ and $S_b$ $$S_a > S_b \quad (2)$$

thereby yielding:

$$Y_{ab} > 0 \quad (3)$$

Conversely, if object plane 9 is out of focus and positioned below the best focus plane 10, illuminated spot 7 is positioned to the left of the microscope's main optical axis resulting in image 17 contained within photo detector 14b. This results in the following relationship between signals $S_a$ and $S_b$:

$$S_a < S_b \quad (4)$$

thereby yielding:

$$Y_{ab} < 0 \quad (5)$$

The differential signal received from detectors 14a and 14b, i.e. signal $(S_a - S_b)$, signal is normalized by dividing this difference signal by the sum of these signals, i.e. signal $(S_a + S_b)$, as seen in equation (1). The normalization is performed in order to desensitize the sensor response to the degree of reflectivity of the target object (object plane). The normalization applies to signals within the dynamic range of processing electronic circuits shown in FIG. 5. If the signal level produced by the detectors 14 exceeds the dynamic range of the processing electronic circuits and causes, for example, saturation or insufficient signal level, the automatic laser intensity control may be employed to alleviate the effect.

Figure 7:
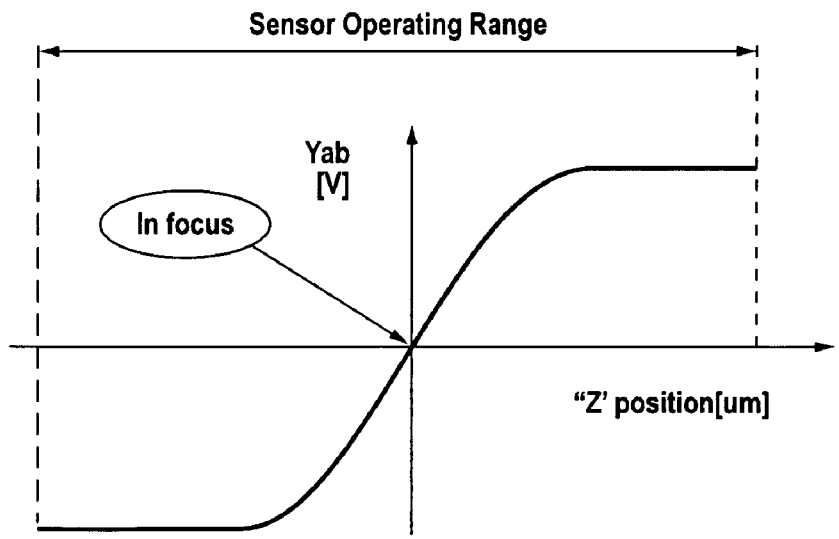
FIG. 7 shows the tracking auto-focus sensor response to changes of microscope position along the Z axis.

FIG. 7 shows the gap sensor's response to changes of microscope position along the Z axis. The response characteristics of the gap sensor enables unambiguous detection of in focus position ($Y_{ab}=0$) and further enables determination of the direction towards the best focus position by means of the sign of the $Y_{ab}$ signal.

A tracking AF sensor, in accordance with the present invention, generates a small, diffraction limited spot on sensor 14, when the microscope is in focus. Consequently, the energy distribution in such a diffraction limited spot is determined by the optics performance rather than the object plane surface features reflectivity. Accordingly, the in-focus indication accuracy is substantially unaffected regardless of the component, e.g., ITO electrode, bare glass, metal traces, etc, or the transition between these features, that the sensor may be pointing to.

A critical property of the gap sensor for a tracking auto-focus system that distinguishes it from conventional DIP methods is its ability to provide continuous output. The term continuous is understood to mean that the measurement response (output data) time including processing time from the gap sensor is shorter than the time required for the inspection or repair tool to move to and settle at a new plate site of interest. Some sensing devices may require refresh of their output data, or refresh of calculation of output data, and hence, typically do not provide continuous output as defined herein. Move times between defects are less than 1 second, with typical times being approximately 0.7 seconds. Typical dynamic response rate of an optical gap sensor as described above is approximately 2 KHz, or 0.5 milliseconds.

As described above, FIG. 6 shows, in part, one embodiment of the optical gap sensor disposed in the tracking auto-focus of the present invention. The optical gap sensor shown in FIG. 6 has the capability to measure the Z position relative to a known Z=0 baseline (best focus), and further to distinguish the direction and distance from best focus plane. It is understood that other optical gap sensor arrangements may be used that meet the requirements noted above. It is further understood that other non-optical gap sensors, such as capacitive sensors, suitable for the tracking auto-focus system of the present invention and meeting the requirements noted above may be used.

The tracking AF system of the present invention as described above, improves utilization efficiency by eliminating the time required to focus the review. The tracking AF system maintains the review microscope in focus regardless of whether the camera is stationary or in motion. This enables collecting review images on-the-fly (without taking the time to stop the microscope head) by means of freezing the motion with short in-duration intense light pulses. Accordingly, on-the-fly image acquisition of a defective line on the TFT array is enabled. Other embodiments of the tracking AF system of the present invention may be operated in the rapid defect image capture. In this mode, images of nearly all the defects within a plate are captured and classified, and the repair recipe is assigned automatically to the repairable defects. After the initial rapid defect image capture, the repair tools are properly dispatched to repair the defects. The tracking AF system improves rapid defect image capture efficiency by facilitating defect image capture on-the-fly, without taking time to stop the review microscope.

The above embodiments of the present invention are illustrative and not limitative. The invention is not limited by the type of current source or current sink used in the differential amplifier of the present invention. Other additions, subtractions, deletions, and modifications may be made without departing from the scope of the present disclosure as set forth in the appended claims.

What is claimed is:

1. An apparatus comprising:
   a non-contacting sensor adapted to continuously measure a distance between a head and a flat panel display comprising a plurality of pixels, said flat panel display being in motion relative to the head; said non-contacting sensor adapted to measure first and second values associated with the distance; and
   a servo control system, said servo control system further comprising:
      control circuitry adapted to generate a first signal defined by the measured distance and a first predefined value; and
      an actuator adapted to vary the head's position in accordance with the first signal such that the distance between the head and the flat panel display is maintained continuously within a predefined range, wherein said distance is detected as falling within the predefined range if the first signal has a value that is equal to or less than a second value associated with the predefined range.

2. The apparatus of claim 1 further comprising:
   an analog-to-digital converter adapted to convert to a digital signal an associated analog signal generated by the non-contacting sensor.

3. The apparatus of claim 2 further comprising:
   a signal conditioning block adapted to linearize the converted digital signal to generate a linearized signal representative of the measured distance.

4. The apparatus of claim 3 wherein said actuator comprises:
   an amplifier;
   a linear motor; and
   a linear encoder.

5. The apparatus of claim 4 wherein said head is adapted to inspect the flat panel display.

6. The apparatus of claim 4 wherein said head is adapted to repair the flat panel display.

7. The apparatus of claim 4 wherein said head includes an objective lens of a microscope being focused on the flat panel display.

8. The apparatus of claim 1 wherein said first measured value is associated with a first optical image and wherein said second measured value is associated with a second optical image.

9. The apparatus of claim 8 wherein said head includes an objective lens of a microscope being focused on the flat panel display wherein said first measured value is greater than said second measure value if an object plane is positioned above a best focus plane, thereby causing an illuminated spot to appear on a first side of the microscope's main optical axis.

10. The apparatus of claim 9 wherein in response to said first measured value being greater than said second measured value, an image is formed.

11. The apparatus of claim 10 wherein said first measured value is less than said second measured value if an object plane is positioned below a best focus plane, thereby causing an illuminated spot to appear on a second side of the microscope's main optical axis.

12. The apparatus of claim 11 wherein in response to said first measured value being less than said second measured value, an image is formed.

13. The apparatus of claim 12 wherein said first predefined value is dynamically updated to account for a plurality of external conditions.

14. The apparatus of claim 12 wherein said external condition represents deviations in flatness of a chuck adapted to receive the flat panel display.

15. The tracking auto-focus system of claim 12 wherein said external condition represents deviations in flat panel display's thickness.

16. The tracking auto-focus system of claim 15 wherein said first predefined value is zero.

17. A method of continuously maintaining a head within a predefined range of a flat panel display, the method comprising:
   continuously measuring a distance between the head and the flat panel display in a non-contact manner;
   detecting a difference between the measured distance and a predefined distance; and
   varying the head's position relative to the flat panel display so that the detected difference is maintained smaller than a known value so as to maintain the head within the predefined range of the flat panel display; and
   converting to digital signal an analog signal representative of the measured distance.

18. The method of claim 17 further comprising:
   linearizing the converted digital signal.

19. The method of claim 17 further comprising:
   inspecting the flat panel display using the head.

20. The method of claim 17 further comprising:
   repairing the flat panel display using the head.

21. The method of claim 17 further comprising:
   disposing an objective lens of an optical system in the head, said objective lens being maintained within the predefined range of the flat panel display so as to be continuously focused on the flat panel display.

22. The method of claim 21 further comprising:
   encoding the signal carrying information representative of a new position of the objective lens; and
   varying the position of the objective lens using a linear motor and in accordance with the encoded signal.

23. The method of claim 22 further comprising:
   generating a first signal in response to a first image of a beam of light;

generating a second signal in response to a second image of the beam of light; and generating a third signal defined by the first and second signals, wherein an in-focus condition is detected if the third signal has a value that is equal to or smaller than a first predefined value.

24. The method of claim 23 further comprising:

causing said second signal to be greater than said first signal if an object plane is positioned above a best focus plane, and causing an illuminated spot to appear on a first side of an optical axis of the objective lens if said second signal is greater than said first signal.

25. The method of claim 24 further comprising:

causing said second signal to be smaller than said first signal if the object plane is positioned below the best focus plane, and causing an illuminated spot to appear on a second side of the optical axis if said second signal is smaller than said first signal.

26. The method of claim 22 further comprising:

generating a first signal in response to a first capacitive measurement;

generating a second signal in response to a second capacitive measurement; and generating a third signal defined by the first and second signals, wherein an in-focus condition is detected if the third signal has a value that is equal to or smaller than a first predefined value.

27. The apparatus of claim 7 wherein said first measured value is associated with a capacitive measurement and wherein said second measured value is associated with a second capacitive measurement.

* * * * *